United States Patent [19]

Amano et al.

[11] 4,130,848
[45] Dec. 19, 1978

[54] CASSETTE TAPE RECORDING AND/OR REPRODUCING APPARATUS

[75] Inventors: Kenichi Amano; Yutaka Suzuki; Yoshio Kishi, all of Tokyo, Japan

[73] Assignee: Sony Corporation, Tokyo, Japan

[21] Appl. No.: 720,742

[22] Filed: Sep. 7, 1976

[30] Foreign Application Priority Data

Jan. 27, 1976 [JP] Japan .................................. 51-7829

[51] Int. Cl.² ............................................ G11B 23/06
[52] U.S. Cl. .................................... 360/132; 360/93; 360/95
[58] Field of Search ..................... 360/93, 95, 96, 132, 360/137; 242/197, 199

[56] References Cited

U.S. PATENT DOCUMENTS

| 3,759,465 | 9/1973 | Janssen et al. | 360/95 |
| 3,781,487 | 12/1973 | Swain et al. | 360/95 |
| 4,050,087 | 9/1977 | Kishi | 360/95 |

Primary Examiner—Vincent P. Canney
Attorney, Agent, or Firm—Lewis H. Eslinger; Alvin Sinderbrand

[57] ABSTRACT

In a tape recording and/or reproducing apparatus for use with a tape cassette including a housing containing a supply of tape and having spaced parallel walls with an opening therebetween at one side of the housing along which a run of the tape is normally guided, and lids mounted on the housing for movement relative to the latter in directions parallel to the planes of the spaced walls between closed positions where the lids extend along the opening for covering respective parts of the tape run and opened positions where the lids are displaced from the opening to permit the withdrawal of the tape therethrough; and in which magnetic heads or transducers for recording and/or reproducing information signals on a tape engaged therewith are mounted on a chassis so as to be spaced from the open side of a cassette housing when the latter is positioned by engagement with locating members on the chassis, and tape withdrawing members are engageable with the tape run in the cassette housing positioned by the locating members and are operative to withdraw the tape through the open side and into engagement with the transducers: a cassette loading device is provided which includes a cassette holder pivotally mounted for movement in respect to the chassis between an inoperative position spaced from the locating members for permitting the insertion and removal of a cassette in the holder and an operative position where a cassette in the holder is engaged with the locating members, lid opening members mounted for movement in respect to the holder between an inactive position at which the lid opening members are spaced from a cassette in the holder in a direction substantially perpendicular to the planes of the walls of the cassette housing so as to avoid interference with the insertion and removal of the cassette in the holder, and an active position at which the lid opening members are engageable with the lids of a cassette in the holder and are displaced relative to the holder in the direction of movement of the respective lids from their closed positions to their opened positions, and a cam arrangement connecting the lid opening members with the holder and chassis for disposing the lid opening members in their inactive and active positions when the holder is in its inoperative and operative positions, respectively. Preferably, the cam arrangement is operative to move the lid opening members relative to the chassis in opposition to the initial pivotal movement of the holder from its inoperative position so that the engagement of the lid opening members with the lids and the substantial opening of the latter can be achieved well before the arrival of the holder at its operative position.

9 Claims, 10 Drawing Figures

CASSETTE TAPE RECORDING AND/OR REPRODUCING APPARATUS

BACKGROUND OF THE INVENTION

1. Field of the Invention

This invention relates generally to cassette tape recording and/or reproducing apparatus, and more particularly is directed to a cassette loading device for a tape recording and/or reproducing apparatus of the type in which the tape is withdrawn from a cassette housing for recording and reproducing information signals on the tape.

2. Description of the Prior Art

The conventional tape cassette for the recording and/or reproducing of audio signals is provided with a plurality of openings at one side of the cassette housing through which a magnetic recording and/or reproducing head, a pinch roller, capstan and the like may be inserted into the cassette housing to record and/or reproduce signals on the tape while the latter is driven or transported in a predetermined direction. However, in such a tape cassette, the number and size of the openings that may be formed in the cassette housing are limited and this, in turn, limits the number and size of the magnetic heads that may be employed for recording and reproducing operations. Accordingly, in existing tape recording and/or reproducing apparatus intended for use with tape cassettes of the described type, that is, in which the tape remains wholly within the cassette housing during recording and reproducing operations, the magnetic head used for reproducing signals recorded on the tape is also used, in association with an erasing head, for recording new signals on the tape. It is known that the use of the same magnetic head for both recording and reproducing operations limits the quality of the audio or other information signals that may be recorded and reproduced thereby. Further, when the magnetic recording and/or reproducing head is inserted into the cassette housing for engagement with the tape therein, as aforesaid, it is difficult to ensure the precise positioning of the tape relative to such head, and variations of the position or path of the tape relative to the recording and/or reproducing head also deleteriously affect the quality of the recorded and reproduced signals.

Therefore, when it is desired to obtain high quality recording and reproducing of audio or other information signals, it has been the usual practice to employ apparatus of the so-called open-reel type having separate or individual heads for respectively recording and reproducing signals on the tape which is precisely guided relative to such heads in the run of the tape between the supply and take-up reels. However, apparatus of the open-reel type has the well-known disadvantages of requiring the manual threading of the leader or end portion of the tape from the supply reel past the guide pins and heads, and between each capstan and associated pinch roller to the take-up reel when installing a tape on the apparatus, and of requiring rewinding of the entire tape onto the supply reel when one tape is to be exchanged for another.

In order to avoid the above described disadvantages of recording and reproducing apparatus of the open-reel type and the limitations on the quality of recording and reproducing previously attainable with cassette type recording and reproducing apparatus, it has been proposed, for example, as disclosed in United Kingdom Patent Specification No. 1,121,125, published July 24, 1968, to provide a cassette from which the tape is withdrawn when signals are to be recorded or reproduced thereon by means of respective magnetic heads which are disposed outside of the cassette housing. However, in cassettes intended for use with such apparatus, a run of the tape is exposed at the exterior of the cassette housing even when the cassette is not in use, so that the exposed tape is susceptible to being damaged or even severed and will collect dust thereon.

The exposure of the tape when the cassette is not in use may be avoided by the cassette arrangement disclosed in U.S. Pat. No. 3,900,171, issued Aug. 19, 1975, and having a common assignee herewith. In such cassette, the housing has spaced parallel walls with an opening therebetween extending along one side of the housing, and a lid is provided which is normally spring-biased and locked in a closed position to cover the tape extending along such open side of the cassette housing when the cassette is not in use so as to protect the tape from damage thereto. However, in this previously proposed tape cassette, the lid is pivotally mounted for movement in respect to the housing about an axis which extends along the open side of the housing and is parallel to the planes of the spaced walls thereof. Therefore, in moving about such axis from its closed position to an opened position, the lid has to be moved across the plane of one of the spaced parallel walls of the cassette housing, for example, the wall which is at the top of the cassette housing in the normal operating position of the latter. In other words, the lid has to be moved in the upward direction from its closed position to its opened position when the cassette is in its normal operating position. Thus, if a recording and/or reproducing apparatus for use with a tape cassette of the described type is provided with a suitable mechanism for effecting the upward opening movement of the lid prior to the withdrawing of the tape from the cassette housing for a recording or reproducing operation, the cassette can be used only in the one orientation in which the lids open upwardly. In other words, the cassette cannot be inverted for a recording or reproducing operation, as the lid would then open downwardly and could not be actuated by the existing lid opening mechanism. Thus, the described tape cassette cannot be used for recording and/or reproducing operations of the type in which, for example, one or more tracks on the tape are used for recording or reproducing information signals with the cassette in one orientation, and the cassette is inverted for permitting recording or reproducing of information signals in one or more other tracks on the tape.

In order to avoid the above described disadvantages of the tape cassette having its lid swingable from a closed position to an opened position about an axis extending along the open side of the cassette housing, it has been proposed, for example, as disclosed in U.S. Patent Application Ser. No. 636,829, filed Dec. 2, 1975, now U.S. Pat. No. 4,022,395 and having a common assignee herewith, to provide a tape cassette with a housing having spaced parallel walls with an opening therebetween at one side of the housing along which a run of the tape is normally guided, and lide mounted for pivoting relative to the housing about respective axes which are perpendicular to the spaced parallel walls adjacent the opposite ends of the open side of the housing, so that the lids are movable relative to the housing in directions parallel to the planes of the spaced walls thereof between closed positions where the lids extend along the open side for covering respective parts of the tape run and opened positions where the lids are displaced from the opening to permit the withdrawal of the tape therethrough. By reason of such movable mounting of the lids, the same lid opening mechanism can be employed for opening the lids when the cassette is operatively positioned in either one of two relatively inverted orientations. However, in the existing tape recording and/or reproducing apparatus for use with a tape cassette of the last described type, either a separate lid opening mechanism is provided for opening the lids after the cassette has been brought to its operative position by a movable cassette holder, or a lid opening mechanism is combined with the tape withdrawing means by which the tape is withdrawn from the cassette housing and moved into engagement with the recording and/or reproducing heads and the tape drive capstan which are spaced from the operatively positioned cassette. If a separate lid opening mechanism is provided, as aforesaid, the structure and operation of the recording and/or reproducing apparatus are made undesirably complex, and a substantially large clearance has to be provided between the heads and capstan and the operatively positioned cassette to permit the swinging of the lids to the opened positions. On the other hand, if the lid opening mechanism is combined with the tape withdrawing means, then the lids remain in their closed positions during fast-forward and rewind operations of the recording and/or reproducing apparatus so that the lids may come into contact with and mar the tape while the latter is being moved at high speed during such operations.

OBJECTS AND SUMMARY OF THE INVENTION

Accordingly, it is an object of the invention to provide a tape recording and/or reproducing apparatus for use with a tape cassette of the last described type, and in which the above-mentioned disadvantages of the previously existing or proposed apparatus are avoided.

More specifically, it is an object of this invention to provide a cassette loading device in a tape recording and/or reproducing apparatus, as aforesaid and in which the lids of the tape cassette are automatically opened in the course of the movement of the cassette to its operative position.

In accordance with an aspect of this invention, in a tape recording and/or reproducing apparatus for use with a tape cassette including a housing containing a supply of tape and having spaced parallel walls with an opening therebetween at one side of the housing along which a run of the tape is normally guided, and lids mounted on the housing for movement relative to the latter in directions parallel to the planes of the spaced walls between closed positions where the lids extend along the opening for covering respective parts of the tape run and opened positions where the lids are displaced from the opening to permit the withdrawal of the tape therethrough; and which apparatus magnetic heads or transducers for recording and/or reproducing information signals on a tape engaged therewith are mounted on a chassis so as to be spaced from the open side of a cassette housing when the latter is operatively positioned by engagement with locating members on the chassis, and tape withdrawing members are engageable with the tape run in the cassette housing operatively positioned by the locating members and are operative to withdraw the tape through the open side of the cassette housing into engagement with the transducers;

a cassette loading device is provided which includes a cassette holder mounted for pivotal movement in respect to the chassis between an inoperative position spaced from the locating members for permitting the insertion and removal of a cassette in the holder and an operative position where a cassette in the holder is engaged with the locating members, lid opening members mounted for movement in respect to the holder between an inactive position at which the lid opening members are spaced from a cassette in the holder in a direction substantially perpendicular to the planes of the spaced walls of the cassette housing so as to avoid interference with the insertion and removal of the cassette in the holder, and an active position at which the lid opening members are engageable with the lids of a cassette in the holder and are displaced relative to the holder in the direction of movement of the respective lids from their closed positions of their opened positions, and a cam arrangement connecting the lid opening members with the holder and chassis for disposing the lid opening members in their inactive and active positions when the holder is disposed in its inoperative and operative positions, respectively; and for causing the lid opening members to effect substantial opening of the lids prior to the arrival of the holder in its operative position.

The above, and other objects, features and advantages of this invention, will be apparent in the following detailed description of an illustrative embodiment which is to be read in connection with the accompanying drawings.

DETAILED DESCRIPTION OF A PREFERRED EMBODIMENT

Figure 1:
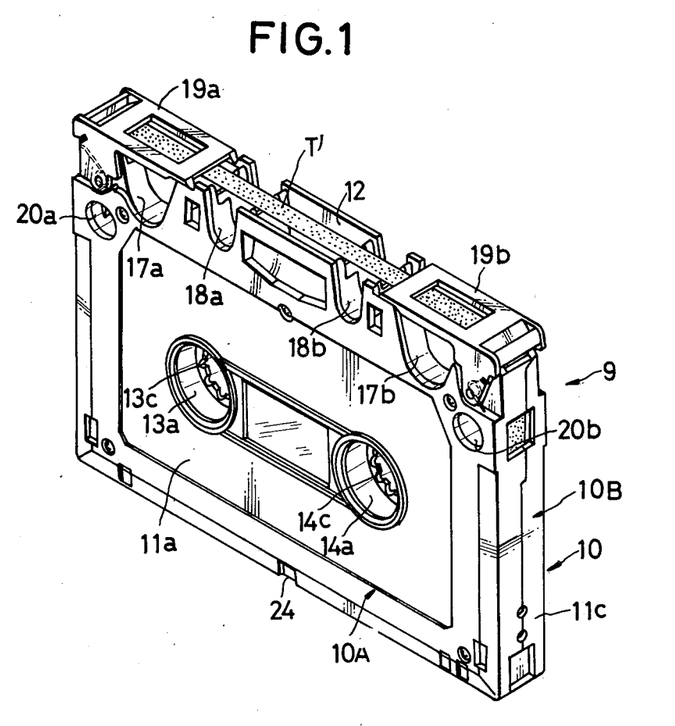
FIG. 1 is a perspective view of a tape cassette of the type which is intended for use in a tape recording and/or reproducing apparatus according to this invention.
Figure 2:
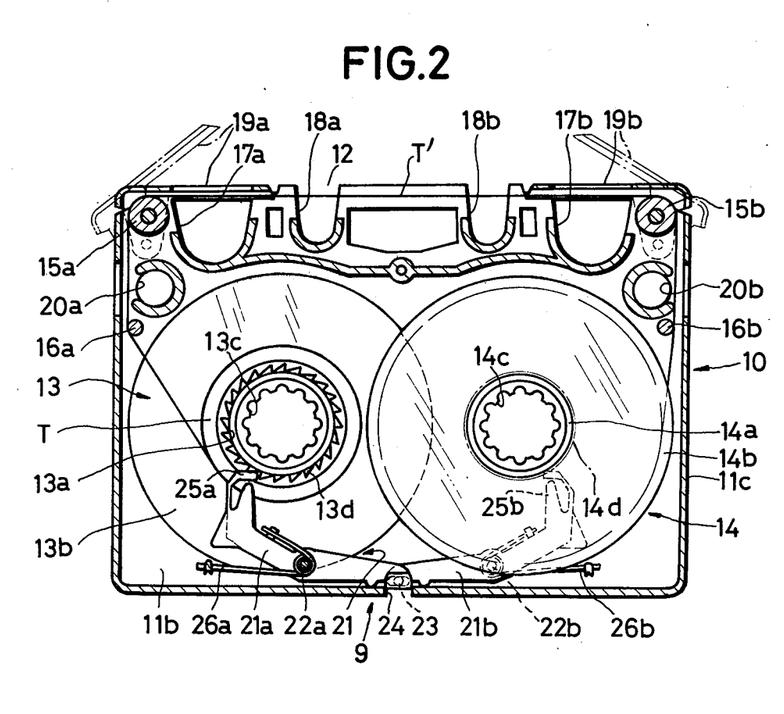
FIG. 2 is a top plan view of the tape cassette of FIG. 1, but which is shown with the upper half of its housing removed.

Referring to the drawings in detail, and initially to FIGS. 1 and 2 thereof, it will be seen that a tape cassette 9 for use in a recording and/or reproducing apparatus according to this invention generally comprises a substantially rectangular cassette housing 10 which is substantially larger than the housing of a normal compact tape cassette, and which is formed of suitably secured together, mating molded plastic sections 10A and 10B providing spaced, parallel walls 11a and 11b and a peripheral wall 11c. It will be apparent that the peripheral wall 11c extends along only three of the sides of rectangular housing 10 so that an opening 12 is defined between walls 11a and 11b along the fourth relatively long side of the housing. A supply of tape T which is wider than the magnetic tape of a normal compact cassette is contained in housing 10 and is wound on supply and take-up reels 13 and 14 (FIG. 2). As shown, supply reel 13 may include a cylindrical hub 13a which, at its opposite ends, is loosely and rotatably guided in circular holes provided in walls 11a and 11b of housing 10, and a single flange 13b which extends radially outward from hub 13a adjacent wall 11b. The inner surface of hub 13a is formed with a plurality of circumferentially spaced apart projections or splines 13c for rotatable coupling of supply reel 13 with a respective reel mounting member or drive shaft of the tape recording and/or reproducing apparatus, as hereinafter described in detail. The take-up reel 14 may similarly include a cylindrical hub 14a which, at its opposite ends, is loosely and rotatably guided in circular holes in walls 11a and 11b, and a single flange 14b extending radially outward from hub 14a adjacent wall 11a. The inner surface of hub 14a is also shown to be formed with a plurality of circumferentially spaced projections or splines 14c for rotatable coupling of take-up reel 14 with a respective reel mounting member or drive shaft of the tape recording and/or reproducing apparatus. As shown, reels 13 and 14 are disposed in side-by-side relation with the flange 13b of reel 13 overlapping or overlying a portion of the flange 14b of reel 14, and with the tape T wound on reels 13 and 14 being guided between the flanges 13b and 14b of such reels and respective inner surface portions of walls 11a and 11b which may be covered with layers of low friction material.

The cassette 9 is also shown to be provided with guide rollers 15a and 15b (FIG. 2) which are rotatably mounted on pins extending between walls 11a and 11b at the corners of housing 10 which are at the opposite ends of opening 12 for guiding tape T between reels 13 and 14 in a run T' extending along the open long side of the cassette housing. Further, guide pins 16a and 16b extend between walls 11a and 11b adjacent the opposite, relatively short sides of rectangular housing 10 and engage the tape between reel 13 and guide roller 15a and between reel 14 and guide roller 15b, respectively.

Walls 11a and 11b of housing 10 are shown to be provided with pairs of aligned, generally U-shaped cutouts 17a and 17b which communicate with opening 12, and which are symmetrically disposed adjacent the opposite ends of the respective long side of the housing. Additional pairs of aligned, relatively smaller generally U-shaped cutouts 18a and 18b which also communicate with opening 12 are provided in walls 11a and 11b at symmetrical positions spaced inwardly from cutouts 17a and 17b, respectively. The tape cassette 9 for use in the recording and/or reproducing apparatus according to this invention is also shown to be provided with lid members 19a and 19b which are mounted to pivot relative to housing 10 about respective pivot axes disposed adjacent the corners of rectangular housing 10 which are at opposite ends of the long open side of the housing, and which are spring-biased to their closed positions shown on FIG. 1 and further shown in full lines on FIG. 2. The pivot axes of lid members 19a and 19b are perpendicular to the planes of walls 11a and 11b for permitting swinging movements of the lid members in directions parallel to the planes of such walls 11a and 11b between the mentioned closed positions at which lid members 19a and 19b extend along at least part of the open long side of the housing for covering or protecting at least respective parts of the tape in run T', and opened positions, as shown in broken lines on FIG. 2, in which lid members 19a and 19b are displaced from opening 12 for permitting the withdrawal of the tape through such opening, as hereinafter described in detail. Preferably, as shown, lid members 19a and 19b are dimensioned to at least extend across cutouts 17a and 17b, respectively, when the lid members are in their closed positions.

Walls 11a and 11b of cassette housing 10 are also preferably provided with pairs of aligned holes 20a and 20b located adjacent the opposite relatively short sides of the rectangular housing at positions that are relatively near to the open long side of the housing for receiving locating members, as hereinafter described in detail, by which the cassette housing may be accurately located at an operative position thereof within the tape recording and/or reproducing apparatus.

Finally, the tape cassette 9 may be provided with a brake assembly 21 (FIG. 2) which is engaged when the cassette is not in use for holding reels 13 and 14 against rotation particularly in the directions for unwinding the tape T therefrom, and which is releasable, as hereinafter described in detail, for permitting free rotation of reels 13 and 14 within cassette housing 10, as when cassette 9 is disposed at an operative position in the recording and/or reproducing apparatus. In the illustrated cassette 9, the brake assembly 21 is shown to comprise levers 21a and 21b which, intermediate their ends, are respectively pivoted on pins 22a and 22b which are laterally spaced apart within housing 10 adjacent the long side of the latter remote from opening 12. The laterally inner ends of levers 21a and 21b are adjacent, superposed relation and coupled together, for example, as by a pin and slot connection indicated in broken lines at 23, and such coupled-together inner ends of levers 21a and 21b are exposed at an aperture or window 24 which is substantially centrally located in the adjacent side of the cassette housing. Hooks or pawl-like members 25a and 25b are provided on flexibly resilient extensions of the laterally outer ends of levers 21a and 21b, respectively, and are engageable with serrated gears 13d and 14d which are formed on adjacent end portions of hubs 13a and 14a, respectively. Torsion springs 26a and 26b act on levers 21a and 21b, respectively, so as to urge such levers in the directions for engaging the respective pawl-like members 25a and 25b with the serrated gears 13d and 14d, and for disposing the coupled-together inner ends of levers 21a and 21b against peripheral wall 11c of the cassette housing at the window or aperture 24 therein. Thus, it will be apparent that inward displacement of the coupled-together inner ends of levers 21a and 21b away from peripheral wall 11c at window 24 will be effective to release or disengage brake assembly 21, that is, to move pawl-like members 25a and 25b away from the respective serrated gears 13d and 14d.

Referring now to FIGS. 3-6, it will be seen that, in the illustrated tape recording and/or reproducing apparatus according to this invention for use with the above described tape cassette 9, a chassis plate 27 is disposed within the cabinet 28 of the apparatus in substantially parallel spaced relation to the front panel 29 of such cabinet. A pair of laterally spaced apart cassette locating posts 30a and 30b extend forwardly from chassis plate 27 and have tapered free end portions 30'a and 30'b which extend from radial shoulders 31a and 31b, respectively. Further, a locating pin 30c is directed forwardly from chassis plate 27 at a position displaced downwardly and centered in respect to posts 30a and 30b and terminates substantially at the plane of the shoulders 31a and 31b. The locating posts and pins 30a, 30b and 30c are positioned so that, when a tape cassette 9 is moved inwardly through an opening 29a of front panel 29 of the cabinet, as hereinafter described in detail, tapering end portions 30'a and 30'b of the locating posts enter holes 20a and 20b, respectively, of the cassette housing for locating the latter in directions parallel to the plane of chassis plate 27, while shoulders 31a and 31b and locating pin 30c are engageable with either the wall 11a or 11b of the cassette housing for disposing the latter substantially parallel to chassis plate 27 and at a predetermined distance from the latter.

Figure 5:
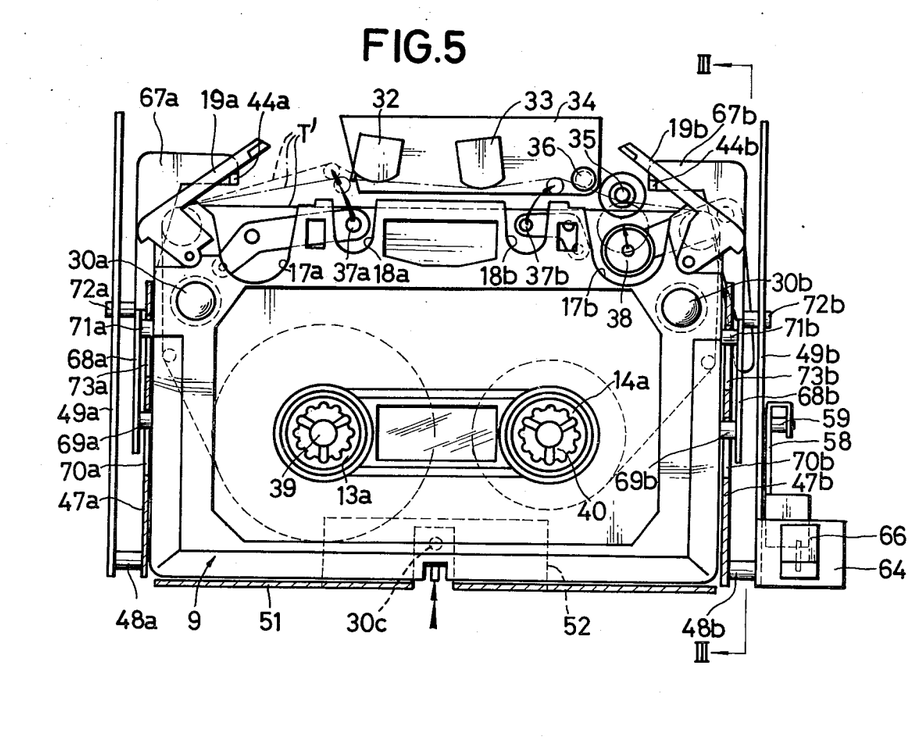
FIG. 5 is a transverse sectional view taken along the line V—V on FIG. 4.

An erasing head 32 and a recording or reproducing head 33, or separate recording and reproducing heads (not shown), are mounted on a head supporting plate 34 fixedly secured to chassis plate 27 at a level substantially above locating posts 30a and 30b so that, when a tape cassette 9 is operatively positioned by such locating posts and pin 30c with the opening 12 of the cassette housing facing upwardly, heads 32 and 33 will be spaced upwardly from run T' of the tape extending along such opening (FIG. 5). A suitably rotated tape drive capstan 35 extends from chassis plate 27 at one side of head mounting plate 34, and a tape guide 36 projects forwardly from head mounting plate at a position between head 33 and capstan 35. Capstan 35 and tape guide 36 are also disposed in the vertical direction, as viewed on the drawings, so as to be spaced upwardly from the upper or open side of cassette housing 10 when the latter is operatively positioned by locating posts 30a and 30b.

The tape recording and/or reproducing apparatus according to this invention is further shown to have a pair of tape withdrawing or shifting members 37a and 37b, and a pinch roller 38 which are normally disposed, as shown in full lines on FIG. 5, so as to extend forwardly into cutouts 18a and 18b, and cutout 17b, respectively, of cassette housing 10 below tape run T' extending along the open side of the cassette housing when the latter is operatively positioned by locating posts 30a and 30b and pin 30c. Further, reel mounting members or spindles 39 and 40 are rotatably supported on chassis plate 27 in front of the latter and are positioned to extend into, and be rotatably coupled with hubs 13a and 14a, respectively, of the supply and takeup reels in the operatively positioned cassette housing.

In accordance with the present invention, a tape recording and/or reproducing apparatus of the type described above is provided with a cassette loading device 41 which generally comprises a cassette holder 42 mounted for movement in respect to the chassis plate 27 between an inoperative or forwardly titled opened position (FIG. 3) spaced forwardly from the locating posts 30a and 30b and pin 30c for the insertion and removal of a cassette 9 in holder 42 and an operative position (FIGS. 4 and 5) where a cassette 9 in holder 42 is moved through opening 29a in front panel 29 and is engaged with locating posts 30a and 30b and pin 30c; lid opening means 43 including lid opening pins 44a and 44b mounted for movement relative to chassis plate 27 and holder 42 between an inactive position (FIG. 4) at which the lid opening pins 44a and 44b are spaced from a cassette 9 in holder 42 in a direction substantially perpendicular to the planes of walls 11a and 11b of the cassette housing so as to avoid interference with the insertion and removal of the cassette in holder 42 at its inoperative position and an active position (FIGS. 4 and 5) at which lid opening pins 44a and 44b are engageable with the lids 19a and 19b of an operatively positioned cassette in the holder 42 and are displaced upwardly relative to such holder, that is, in the direction of movement of the respective lids from their closed positions to their opened positions, and cam means 45 connecting lid opening means 43 with holder 42 and chassis plate 27 for disposing lid opening means 43 in its inactive and active positions when holder 42 is in its inoperative and operative positions, respectively.

In the illustrated embodiment of cassette loading device 41 according to this invention, holder 42 is shown to include a front wall 46 dimensioned to fill opening 29a in front panel 29 of the cabinet, and rearwardly directed flanges 47a and 47b at the opposite sides of front wall 46. Lower end portions of flanges 47a and 47b are pivotally mounted on pins 48a and 48b, respectively, which define a pivoting axis for swinging movement of holder 42 between its inoperative and operative positions, and which are respectively carried by chassis flanges or walls 49a and 49b directed forwardly from the opposite sides of chassis plate 27. The lower end portions of flanges 47a and 47b which extend below front wall 46 of the holder are connected, at their forward edges, by a lateral strip 50. A bottom wall 51 for the holder 42 is directed rearwardly from the lower edge of lateral strip 50 and terminates in an upwardly directed flange 52 so that lateral strip 50, bottom wall 51 and flange 52 cooperate to define retaining means for the lower end portion of a cassette 9 when the latter is slidably inserted in holder 42 from above in back of front wall 46 between flanges 47a and 47b. Further, leaf springs 53 are suitably mounted at the back or inner surface of front wall 46 of the cassette holder so that, when holder 42 is in its operative or closed position (FIG. 4), such springs 53 will act against one of the walls 11a, 11b of a cassette 9 in the holder for securely seating the other of walls 11b, 11a against shoulders 31a and 31b on the locating posts and against the free end of locating pin 30c. An arm 54 integral with the lower end portion of flange 47b is directed rearwardly therefrom, and a tension spring 55 is connected between the free end of arm 54 and a spring anchor 56 on chassis plate 27 for urging holder 42 to swing in the counter-clockwise direction about the pivot axis defined by pins 48a and 48b to the inoperative or opened position of the holder.

Figure 6:
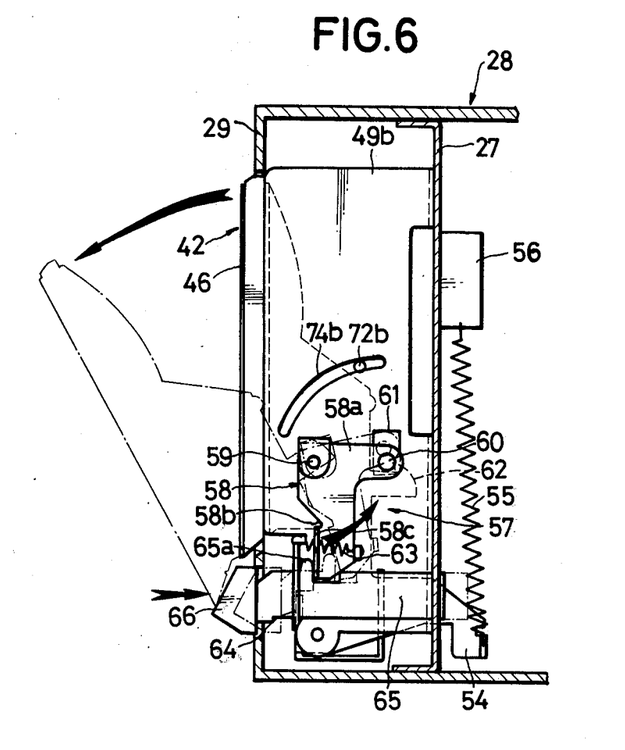
FIG. 6 is a view similar to that of FIG. 4, but showing the device as viewed along the line VI—VI on FIG. 5.

In order to releasably retain holder 42 in its closed or operative position against the urging of spring 55, the cassette loading device 41 according to this invention is provided with a latch mechanism 57 (FIG. 6). As shown, the latch mechanism 57 includes an L-shaped latch lever 58 which is pivotally mounted on a pin 59 directed outwardly from side flange 49b of the chassis. A rearwardly directed arm 58a of latch lever 58 carries a latch pin 60 which extends inwardly through an aperture 61 in chassis flange 49b, and which is engageable with a latching nose 62 extending from the back edge of the adjacent holder flange 47b. Latch lever 58 is urged to turn in the clockwise direction, as viewed on FIG. 6, by a spring 63 which is connected between an anchor tab on a downwardly directed arm 58b of lever 58 and an outwardly directed lug 64 on chassis flange 49b. An ejecting slide 65 is longitudinally slidable in suitable guide slots formed in lug 64 and in chassis plate 27, and an ejecting button 66 is secured on the forward end of slide 65 which projects through a suitable aperture in front panel 29. A projection 65a on ejecting slide 65 acts rearwardly against a flange 58c on the downwardly directed arm 58b of latch lever 58. It will be apparent that spring 63 normally urges latch lever 58 to the position shown in full lines on FIG. 6 so that, when holder 42 is moved to its closed or operative position, latch pin 60 rides over nose 62 so as to engage with the latter for retaining the holder in its operative position. However, when ejecting button 66 is depressed to effect rearward displacement of ejecting slide 65, projection 65a on the slide acts rearwardly against flange 58c so as to turn lever 58 against the force of spring 63, for example, to the position indicated in broken lines on FIG. 6, whereby to release pin 60 from nose 62 and permit spring 55 to return holder 42 to its inoperative or opened position indicated in broken lines.

In the illustrated cassette loading device 41 according to this invention, the lid opening means 43 are further shown to include substantially L-shaped support plates 67a and 67b for lid opening pins 44a and 44b, respectively (FIG. 5). The support plates 67a and 67b are shown to have horizontal portions directed inwardly toward each other with the respective pins 44a and 44b being directed forwardly from the inner ends of such horizontal portions. Further, the support plates 67a and 67b have downwardly directed portions which, at their lower ends, are integrally or otherwise joined to forwardly directed flange portions 68a and 68b. The flange portion 68a of support plate 67a is shown to be laterally interposed between side flange 47a of the cassette holder and chassis flange 49a, while the flange portion 68b of support plate 67b is similarly laterally interposed between side flange 47b of the holder and chassis flange 49b (FIG. 5). Inwardly directed pivot pins 69a and 69b extend from the lower parts of flange portions 68a and 68b, respectively, and are slidably engageable in slots 70a and 70b formed in side flanges 47a and 47b of holder 42 and extending substantially parallel to the plane of front wall 46 thereof. It will be apparent from the foregoing that the support plates 67a and 67b and the lid opening pins 44a and 44b thereof are mounted for swinging movements relative to holder 42 about axes defined by the respective pivot pins 69a and 69b, and further are movable or displaceable relative to holder 42 in directions substantially parallel to the plane of the front wall 46 by slidable movements of the respective pivot pins 69a and 69b along with slots 70a and 70b.

In order to control the movements of lid opening means 43 with respect to chassis plate 27 and holder 42 in response to the movements of the holder between its inoperative and operative positions, cam means 45 are shown to include first cam follower pins 71a and 71b directed inwardly from flange portions 68a and 68b, respectively, at locations spaced upwardly by substantial distances from the respective pivot pins 69a and 69b, and second cam follower pins 72a and 72b directed outwardly from flange portions 68a and 68b approximately at the same level as cam follower pins 71a and 71b, but spaced rearwardly from the latter. The first cam follower pins 71a and 71b are respectively slidably received in first cam slots 73a and 73b formed in side flanges 47a and 47b, respectively, of holder 42, while second cam follower pins 72a and 72b are respectively slidably received in second cam slots 74a and 74b formed in the adjacent chassis flanges 49a and 49b, respectively.

Figure 7A:
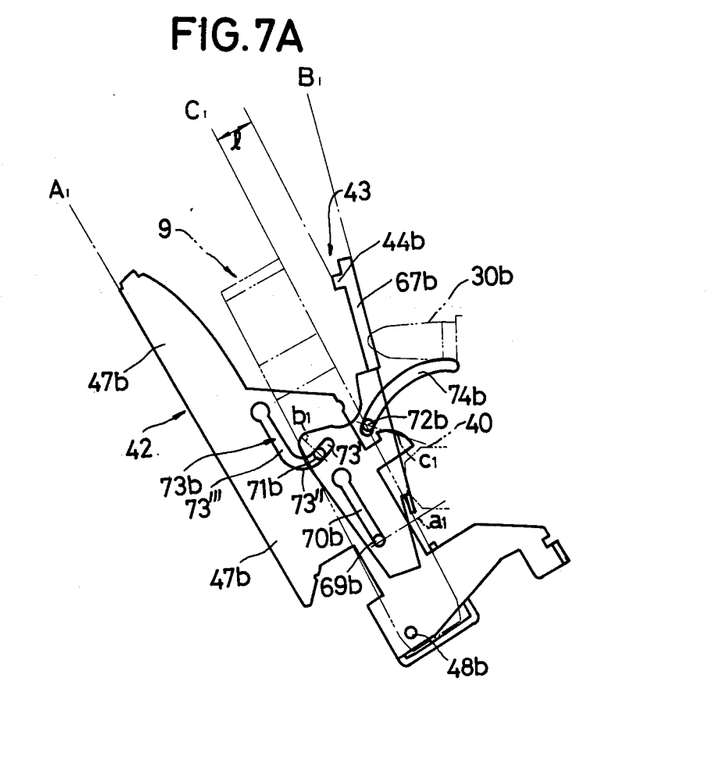
FIGS. 7A–7D are schematic side elevational views of the cassette loading device of FIGS. 3–6 shown in successive phases of a cassette loading operation.

As is shown particularly on FIG. 7A in respect to cam slot 71b, each of the first cam slots 71a and 71b is generally L-shaped so as to include a lower or initial, forwardly directed portion 73' receiving the respective cam follower pin 71a or 71b in the opened or inoperative position of holder 42 and being substantially equidistant along its length from the lower end of the slot 70a or 70b at which the pivot pin 69a or 69b is disposed in the opened or inoperative position of the holder. The initial portion 73' of each of the cam slots 73a and 73b leads through an upwardly curved transistion portion 73'' to a substantially rectilinear portion 73''' which extends upwardly substantially parallel to the front wall 46 of holder 42. As is also shown on FIG. 7A in respect to second cam slot 74b, each of the second cam slots 74a and 74b has a downwardly concave arcuate configuration so as to extend upwardly and rearwardly from the lower end thereof at which the respective cam follower pin 72a or 72b is disposed in the inoperative or opened position of holder 42. It will also be seen that the spacing between pivot pins 69a and 69b and cam follower pins 71a and 71b, respectively, in the direction parallel to the front wall 46 of holder 42 is selected so that pivot pins 69a and 69b will be held against the lower ends of the respective slots 70a and 70b so long as cam follower pins 71a and 71b engage the initial portions 73' of the respective cam slots 73a and 73b.

Figure 3:
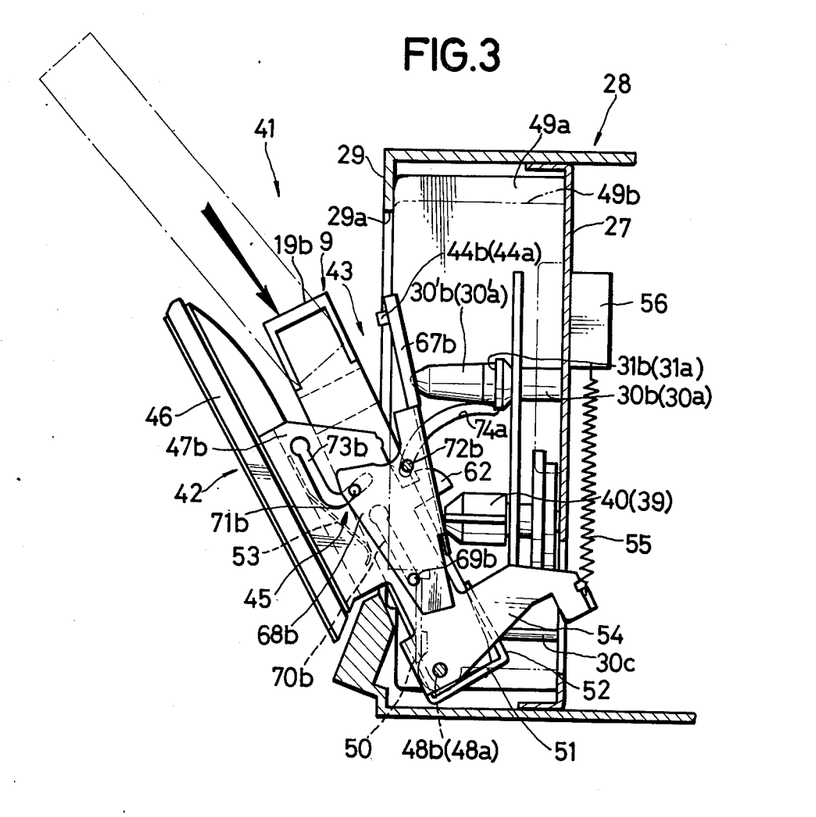
FIG. 3 is a side elevational view of an embodiment of a cassette loading device according to this invention which is shown with its cassette holder in an inoperative or cassette receiving position thereof, and which is shown partly in section as viewed along the line III—III on FIG. 5.
Figure 4:
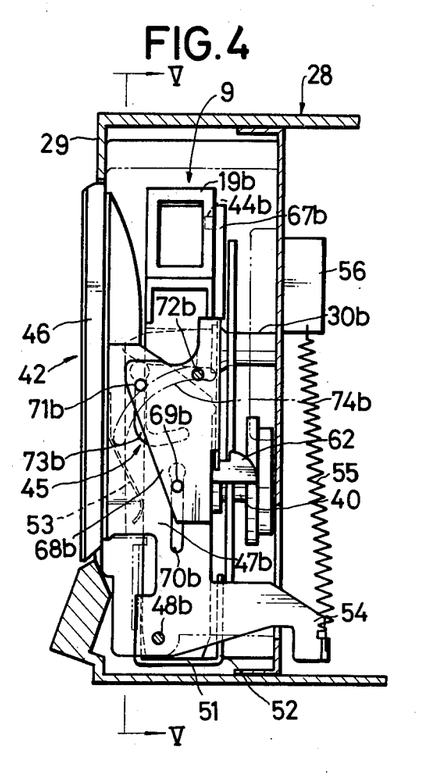
FIG. 4 is a view similar to that of FIG. 3, but with the cassette holder being shown in an operative position.

The above described cassette loading device 41 according to this invention operates as follows:

With the tape recording and/or reproducing apparatus in its stop or rest mode so that tape withdrawing or shifting members 37a and 37b and pinch roller 38 are all disposed in the positions shown on FIG. 5, and with holder 42 being located in its opened or inoperative position, as shown on FIGS. 3 and 7A, a cassette 9 is inserted into the holder from above with the opening 12 and lids 19a and 19b of the cassette being uppermost while the cassette housing rests on the bottom wall 51 between strip 50 and flange 52 of the holder. With holder 42 in its inoperative position, as indicated by the line $A_1$ on FIG. 7A, pivot pin 69b and cam follower pins 71b and 72b are respectively at the positions $a_1, b_1$ and $c_1$ on FIG. 7A to determine the inactive position of the respective lid opening pin 44b, in which inactive position of lid opening pin 44b the respective support plate 67b is in a plane indicated by the line $B_1$ which is at a substantial angle to the line $A_1$. Thus, in the inactive position of lid opening pin 44b, the latter is spaced a substantial distance 1 rearwardly from the back surface of a cassette 9 in holder 42, as represented by the line $C_1$. Moreover, with pins 69b, 71b and 72b at the positions $a_1, b_1$ and $c_1$ corresponding to the inoperative position of holder 42 and the inactive position of lid opening pin 44b, pivot pin 69b is at the lower end of slot 70b, cam follower pin 71b is disposed in the initial portion 73' of cam slot 73b, and cam follower pin 72b is at the lower end of cam slot 74b, as shown on FIG. 7A, whereby to positively establish the inactive position of lid opening pin 44b which, by reason of the previously mentioned distance 1 from the back surface of cassette 9 in holder 42 avoids any interference with the insertion or removal of the cassette in the inoperatively positioned holder.

Figure 7B:
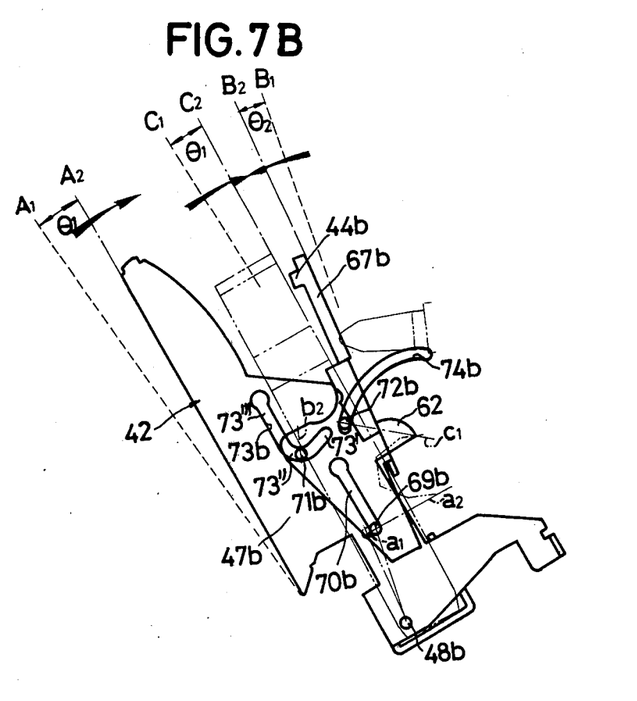

When it is desired to effect a loading operation of device 41, holder 42 is manually pushed in the rearward direction so as to pivot about pivot pins 48a and 48b. During the initial swinging movement of holder 42, for example, through the angle $\theta_1$ from the position $A_1$ to the position $A_2$ on FIG. 7B, cam follower pin 71b moves along initial portion 73' of the respective cam slot 73b so that pivot pin 69b is held against the lower end of slot 70b and moves rearwardly with the latter from the position $a_1$ to the position $a_2$ about the pivoting axis of holder 42, while cam follower pin 72b remains against the lower end of cam slot 74b which is fixedly positioned in the chassis flange 49b. Therefore, during the initial rearward swinging of holder 42 through the angle $\theta_1$ and the corresponding initial swinging of the rear surface of the cassette through the angle $\theta_1$ from the position $C_1$ to the position $C_2$ on FIG. 7B, the support plate 67B for lid opening pin 44b is swung forwardly through the angle $\theta_2$ from the position $B_1$ to the position $B_2$, that is, support plate 67b is turned in the counter-clockwise direction about an axis defined by the cam follower pin 72b in response to the rearward displacement of pivot pin 69b from the position $a_1$ to the position $a_2$. By reason of the foregoing, the lid opening pin 44b, while being originally relatively widely spaced from the cassette 9 when the latter is inserted in the holder 42 at the inoperative position of the latter, is rapidly moved near to the cassette, as on FIG. 7B, in response to the initial movement of the holder through the relatively small angle $\theta_1$ from its inoperative position.

Figure 7C:
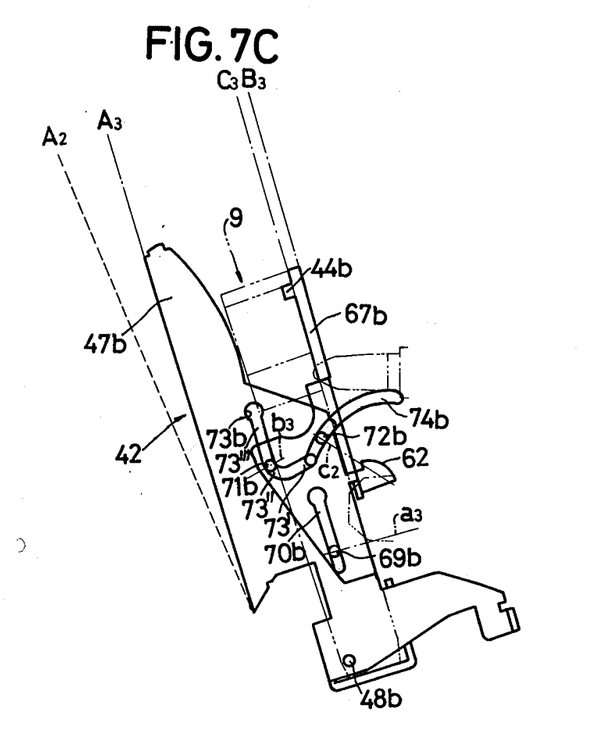

As swinging movement of holder 42 away from its inoperative or opened position is continued, for example, from the position indicated by the line $A_2$ to the position indicated by the line $A_3$ on FIG. 7C, cam follower pin 71b moves along the upwardly curved transition portion 73" of cam slot 73b so that pivot pin 69b and cam follower pin 72b can move upwardly along slot 70b and cam slot 74b, for example, to the positions indicated at $a_3$ and $c_2$, respectively. In response to such movements of pins 69b, 71b and 72b, support plate 67b is moved to the position $B_3$ against the back surface of the cassette, as indicated by the line $C_3$, with the result that lid opening pin 44b extends into the cutout 17b of the cassette housing and engages against the underside of the respective lid 19b.

Figure 7D:
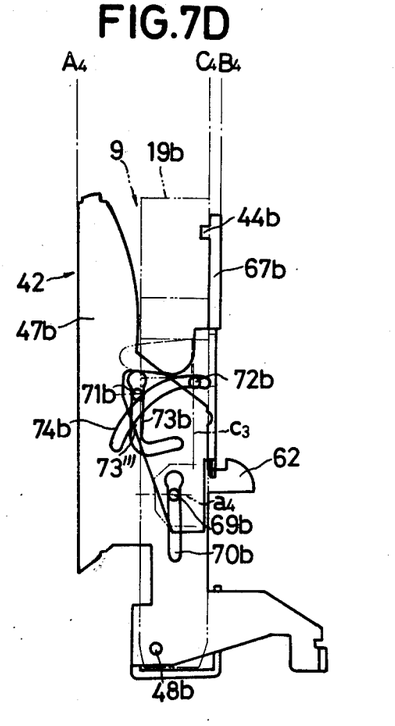

During the remaining rearward swinging of holder 42, for example, from the position indicated at $A_3$ on FIG. 7C to its fully closed or operative position indicated at $A_4$ on FIG. 7D, cam follower pin 72b moves along the upwardly and rearwardly curved cam slot 74b, for example, to the position indicated at $c_3$ so as to cause upward displacement of support plate 67b and lid opening pin 74b relative to the holder. During such upward displacement of plate 67b, pivot pin 69b moves upwardly in slot 70b, and cam follower pin 71b moves upwardly in the rectilinear portion 73''' of cam slot 73b so that support plate 67b is maintained in substantially parallel relation to the front wall of holder 42. Thus, during the movement of holder 42 from the position $A_3$ to the position $A_4$, the plane of support plate 67b indicated at $B_4$ remains fixed relative to the plane of the back surface of cassette 9 indicated at $C_4$ so as to ensure proper engagement of lid opening pin 44b with the respective lid 19b. It will be appreciated that, due to the upward displacement of support plate 67b relative to holder 42 during movement of the latter from the position of FIG. 7C to the position of FIG. 7D, pin 44b effects upward opening movement of the respective lid 19b of the cassette 9 in holder 42, as shown on FIG. 5.

It is to be understood that, as a result of the early engagement of pin 44b with lid 19b by reason of the swinging of support plate 67b in opposition to the initial swinging of holder 42 from its inoperative position, as described above with reference to FIGS. 7A and 7B, the opening of lid 19b can be substantially completed prior to the arrival of holder 42 at its operative position. Thus, the fixedly disposed elements of the tape recording and reproducing apparatus, for example, the capstan 35, can be disposed laterally so as to be located under the lid 19b of the cassette in the open position of such lid, as shown on FIG. 5, without the danger that such positioning of the capstan will interfere with the opening movement of lid 19b.

Although the operation of the pin 44b in opening the lid 19b in response to the movement of holder 42 to its closed or operative position has been specifically described above, it will be apparent that the pin 44a on support plate 67a is similarly displaced for opening the lid 19a by the similar cooperative action of pivot pin 68a in slot 70a and of cam follower pins 71a and 72a in cam slots 73a and 74a.

It is further to be understood that the cassette loading device 41 according to this invention may be provided with an element (not shown) adapted to enter the aperture 24 for releasing the brake assembly 21 of the cassette in response to the movement of the cassette in holder 42 to the operative or closed position of the latter. Further, following the movement of holder 42 to its operative position and the consequent opening of lids 19a and 19b of a cassette 9 in the holder, the tape withdrawing members 37a and 37b and the pinch roller 38 of the tape recording and/or reproducing apparatus may be suitably displaced in the directions of the arrows on FIG. 5 so as to withdraw the tape run T' through the opening of the cassette housing into engagement with heads 32 and 33, and further to engage the tape run with capstan 35 for either a recording or reproducing operation of the apparatus.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a tape recording and/or reproducing apparatus for use with a tape cassette including a housing containing a supply of tape and having spaced parallel walls with an opening therebetween at one side of the housing along which a run of the tape is normally guided, and at least one lid mounted on the housing for movement relative to the latter in directions parallel to the planes of said spaced walls between a closed position where the lid extends along the opening for covering a respective part of said run of the tape and an opened position where the lid is displaced from said opening to permit the withdrawal of the tape therethrough; and in which said apparatus includes a chassis, transducer means mounted on said chassis for recording and/or reproducing information signals on a tape engaged therewith, locating means on said chassis engageable with the cassette housing for disposing the latter with said one side thereof facing toward and spaced from said transducer means, and tape withdrawing means engageable with said tape run in a cassette housing engaged with said locating means and being operative to withdraw the tape through said opening and into engagement with said transducer means: a cassette loading device comprising a cassette holder, means mounting said holder for movement in respect to said chassis between an inoperative position spaced from said locating means for the insertion and removal of a cassette in said holder and an operative position where a cassette in said holder is engaged with said locating means, lid opening means mounted for movement in respect to said holder and said chassis between an inactive position at which said lid opening means is spaced from a cassette in said holder in a direction substantially perpendicular to said planes of the walls of the cassette housing so as to avoid interference with said insertion and removal of the cassette in said holder, and an active position at which said lid opening means is engageable with each said lid of a cassette in said holder and is displaced relative to said holder in the direction of movement of the respective lid from its closed position to its opened position, and cam means connecting said lid opening means with said holder and said chassis for disposing said lid opening means in said inactive and active positions upon the disposition of said holder in said inoperative and operative positions, respectively, said cam means being operative, in response to initial movement of said holder in the direction away from said inoperative position, to move said lid opening means relative to said chassis in a direction opposed to said initial movement of the holder relative to said chassis.

2. A tape recording and/or reproducing apparatus according to claim 1; in which said means mounting the holder defines a pivoting axis for said movement of the holder between said inoperative and operative positions.

3. In a tape recording and/or reproducing apparatus for use with a tape cassette including a housing containing a supply of tape and having spaced parallel walls with an opening therebetween at one side of the housing along which a run of the tape is normally guided, and at least one lid mounted on the housing for movement relative to the latter in directions parallel to the planes of said spaced walls between a closed position where the lid extends along the opening for covering a respective part of said run of the tape and an opened position where the lid is displaced from said opening to permit the withdrawal of the tape therethrough, at least one of said walls of the cassette housing having a cutout for each said lid which communicates with said opening, and each said lid extending across the respective cutout when in said closed position; and in which said apparatus includes a chassis, transducer means mounted on said chassis for recording and/or reproducing information signals on a tape engaged therewith, locating means on said chassis engageable with the cassette housing for disposing the latter with said one side thereof facing toward and spaced from said transducer means, and tape withdrawing means engageable with said tape run in a cassette housing engaged with said locating means and being operative to withdraw the tape through said opening and into engagement with said transducer means: a cassette loading device comprising a cassette holder, means mounting said holder for movement in respect to said chassis about a pivoting axis between an inoperative position spaced from said locating means for the insertion and removal of a cassette in said holder and an operative position where a cassette in said holder is engaged with said locating means, lid opening means mounted for movement in respect to said holder and said chassis between an inactive position at which said lid opening means is spaced from a cassette in said holder in a direction substantially perpendicular to said planes of the walls of the cassette housing so as to avoid interference with said insertion and removal of the cassette in said holder, and an active position at which said lid opening means is engageable with each said lid of the cassette in said holder and is displaced relative to said holder in the direction of movement of the respective lid from its closed position to its opened position, and cam means connecting said lid opening means with said holder and said chassis for disposing said lid opening means in said inactive and active positions upon the disposition of said holder in said inoperative and operative positions, respectively, said cam means being operative, in response to initial movement of said holder in the direction away from said inoperative position, to move said lid opening means relative to said chassis in a direction opposed to said initial movement of the holder, said lid opening means including a pin for each said lid which enters the respective cutout upon the completion of said initial movement of the holder from said inoperative position and which is disposed out of said cutout through said opening for displacing the lid to its opened position in the course of the remaining movement of said holder to said operative position and the consequent movement of said lid opening means to said active position.

4. A tape recording and/or reproducing apparatus according to claim 3; in which said holder includes a front wall, rearwardly directed flanges at the opposite sides of said front wall and being pivoted at their lower ends on said axis, and cassette retaining means extending from said lower ends of said flanges, with said front wall being pitched forwardly in said inoperative position of the holder so that the cassette can be inserted downwardly in back of said front wall between said flanges to rest on said retaining means with said one side of the cassette housing being uppermost; said lid opening means further includes a support for each said pin extending downwardly from the latter, means mounting said support for movement in respect to said holder about a second axis which is parallel and spaced upwardly from the first mentioned axis and displaceable relative to the latter in directions substantially parallel to said front wall of the holder; and said cam means includes first and second cams for controlling the movements of said support for each said pin relative to said holder and said chassis, respectively, said first and second cams being operative, during said initial movement of the holder about said first axis, to cause swinging of said support about said second axis in the direction opposed to said initial movement of the holder so as to bring each said pin close to the respective lid of a cassette in the holder and, during said remaining movement of the holder to its operative position, said first and second cams cause said support to swing with said holder about said first axis while displacing said support and said second axis thereof upwardly in respect to said holder.

5. A tape recording and/or reproducing apparatus according to claim 4; in which said first and second cams are fixed relative to said holder and said chassis, respectively, and said support for each said pin of the lid opening means carries first and second cam follower members engaged with said first and second cams, respectively.

6. A tape recording and/or reproducing apparatus according to claim 5; in which said means mounting said support includes a pivot extending from the support at a location below said first and second cam follower members, and a slot in said flange of the holder extending parallel to said front wall and slidably receiving said pivot.

7. A tape recording and/or reproducing apparatus according to claim 6; in which said chassis includes a chassis plate carrying said transducer means, locating means and tape withdrawing means, and forwardly directed flanges extending from the opposite sides of said chassis plate and being spaced outwardly from said flanges of the holder; and in which said support for each said pin of the lid opening means includes a portion extending between said flanges of the holder and chassis which respectively have said first and second cams thereon, and said portion of the holder has said pivot and said first cam follower member extending from one side thereof and said second cam follower member extending from the other side of said portion of the support.

8. A tape recording and/or reproducing apparatus according to claim 6; in which said first cam member is constituted by a cam slot having an initial, forwardly directed portion substantially equidistant along its length from the lower end of said slot receiving said pivot, and a substantially rectilinear portion which extends upwardly substantially parallel to said front wall of the holder from the forward end of said initial portion of the cam slot; and in which said second cam member is constituted by an arcuate cam slot curving upwardly and rearwardly in a plane parallel to said flange of the holder.

9. A tape recording and/or reproducing apparatus according to claim 1; further comprising spring means urging said holder to said inoperative position, and releasable latch means for retaining said holder in said operative position.

* * * * *